United States Patent
De Vaan

(12) 
(10) Patent No.: US 6,179,425 B1
(45) Date of Patent: Jan. 30, 2001

(54) IMAGE PROJECTION SYSTEM

(75) Inventor: Adrianus J. S. M. De Vaan, Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/281,354

(22) Filed: Mar. 30, 1999

(30) Foreign Application Priority Data

Apr. 2, 1998 (EP) .................................................. 98201049

(51) Int. Cl.[7] .................................................. G03B 21/14
(52) U.S. Cl. .................................................. 353/38; 353/98
(58) Field of Search .................................... 353/8, 20, 328, 353/98; 349/8, 9, 5, 7

(56) References Cited

U.S. PATENT DOCUMENTS

| | | | |
|---|---|---|---|
| 5,098,184 | | 3/1992 | van den Brandt et al. ......... 353/102 |
| 5,278,680 | * | 1/1994 | Karasawa et al. ...................... 353/98 |
| 5,446,510 | * | 8/1995 | Mitsutake et al. .................... 352/20 |
| 5,452,128 | * | 9/1995 | Kimura .................................. 353/20 |
| 5,590,942 | * | 1/1997 | Kimura et al. ......................... 353/20 |
| 5,601,351 | * | 2/1997 | Van Den Brandt .................... 353/20 |
| 5,898,521 | * | 4/1999 | Okada .................................... 353/20 |
| 5,997,143 | * | 12/1999 | Derra et al. ............................ 353/38 |
| 6,028,703 | * | 2/2000 | Sekine et al. ......................... 359/487 |
| 6,036,318 | * | 3/2000 | Itoh ........................................ 353/20 |
| 6,042,237 | * | 3/2000 | DeVaan et al. ........................ 353/38 |

FOREIGN PATENT DOCUMENTS 467447  5/1991 (EP) ................................ G02B/5/30

\* cited by examiner

*Primary Examiner*—William Dowling

(57) ABSTRACT

The invention relates to an image projection system (1). The system comprises an illumination system (3) with a radiation source (5) and a modulation system comprising at least one reflective image display panel (15). The system (1) further comprises a projection lens system (18). A polarization-sensitive beam splitter (17) is arranged between the illumination system (3) and the image display panel (15). The illumination system (3) comprises an integrator system (9) having a first and a second integrator plate (11, 13). A third integrator plate (27) is arranged in the plane of the second integrator plate (13). A reflecting element (29) is arranged between the third integrator plate and its focal plane. The system comprises an optical system for imaging, at least partly, the reflected image of the second integrator plate on the third integrator plate.

6 Claims, 2 Drawing Sheets

IMAGE PROJECTION SYSTEM

BACKGROUND OF THE INVENTION

The invention relates to an image projection system comprising, in this order, an illumination system with a radiation source and an image display system with at least one reflecting image display panel for modulating, with image information, an illumination beam to be supplied by the illumination system, and a projection lens system, a polarization-sensitive beam splitter being arranged between the illumination system and the image display panel.

An image projection system of the type described in the opening paragraph is known, for example, from European patent specification EP 0 467 447, to which U.S. Ser. No. 08/976,517 corresponds. The image projection system described in this specification comprises an illumination system for supplying an illumination beam and an image display system with reflective image display panels for modulating this light beam in conformity with image information to be projected. The display panel may be, for example a liquid crystalline display panel comprising a layer of liquid crystalline material which is provided with a two-dimensional array of pixels which are driven by means of, for example electrodes.

In the known reflective LCD projection systems, the different directions of polarization are separated from each other by means of a polarization-sensitive beam splitter. The part of the light modulated by the display panel, which part must give rise to dark pixels in the image, in other words, the light which is modulated by pixels of the display panel corresponding to dark pixels in the image, is deflected from the light path by the beam splitter and is thus lost. This is at the expense of the peak brightness in the image.

SUMMARY OF THE INVENTION

It is an object of the present invention to provide an image projection system in which a relatively high peak brightness is realized.

To this end, the image projection system according to the invention is characterized in that the illumination system comprises an extra optical system for at least partly re-illuminating the image display system with the light reflected by the image display system to the illumination system, the extra optical system comprising means for redistributing light coming from a pixel of the image display system across a plurality of pixels of the image display system.

The present invention relates to a reflective LCD projection system in which a polarization-sensitive beam splitter (PBS) polarizes the incident light before it is incident on the display panel and analyzes the light modulated by the display panel before it is projected.

The display panel may be, for example a TN (twisted nematic)-based display panel. Such a panel may operate, for example, as follows. When a given voltage is present across the liquid crystalline layer for pixels in the bright state, the direction of polarization of the incident light is rotated. This light is reflected by the layer to the PBS which in its turn reflects the light towards the projection lens. When a different voltage is present across the liquid crystalline layer for pixels in the dark state, so that the layer is deprived of the possibility of rotating the plane of polarization, this light is reflected by the display panel and subsequently passed by the PBS towards the radiation source, because the direction of polarization has not changed.

The light which is modulated by a pixel representing a dark or grey pixel in the image is now not deflected from the light path by the beam splitter but is again sent towards the radiation source and thus recuperated. This light will as yet have an opportunity of being incident on a pixel representing a bright pixel.

In the image projection system described above, the light intended for dark or grey pixels is thus not lost but is re-used.

To prevent ghost images from being produced during this re-use, the illumination system is provided with an extra optical system.

A preferred embodiment of the image projection system according to the invention is characterized in that the integrator system comprises a first and a second integrator plate, and in that the extra optical system comprises a third integrator plate, a lens system and a reflecting element, the third integrator plate being situated in the plane of the second integrator plate, in that the lens system is arranged between the integrator system and the image display panel for at least partly imaging an image of the second integrator plate reflected by the image display panel on the third integrator plate, and in that the reflecting element is arranged between the third integrator plate and its focal plane.

In this way, the second integrator plate is imaged in the plane of the second integrator plate, after reflection on the display panel and via the optical system. The third integrator plate is situated at the location of this reflected image, and an image of the light distribution of the first integrator plate is formed in its focal plane. The mirror ensures that this light distribution is reflected to the third integrator plate where it serves as illumination for the third integrator plate. The light distribution across the display panel after illumination via the third integrator plate is a superposition of the light spots in the first integrator plate.

An embodiment of the image projection system according to the invention is characterized in that an additional polarizer is arranged between the polarization-sensitive beam splitter and the projection lens system.

A higher contrast ratio in the projected image can thereby be achieved.

A further embodiment of the image projection system according to the invention is characterized in that the distance between the third integrator plate and the reflecting element is variable.

Since the light spots in the second integrator plate are mainly concentrated in the center of the individual lenses, the re-used light, which is responsible for the enhanced peak brightness, is also more centralized in the projected image. The light redistribution can be influenced by the above-mentioned measure.

Another embodiment, with which the same object as in the previous paragraph is achieved, is characterized in that the individual lenses of the third integrator plate have mutually different focal lengths.

A further embodiment of the image projection system according to the invention is characterized in that the illumination system comprises a polarization conversion system.

These and other aspects of the invention are apparent from and will be elucidated with reference to the embodiments described hereinafter.

DETAILED DESCRIPTION OF THE PREFERRED EMBODIMENTS

Figure 1:
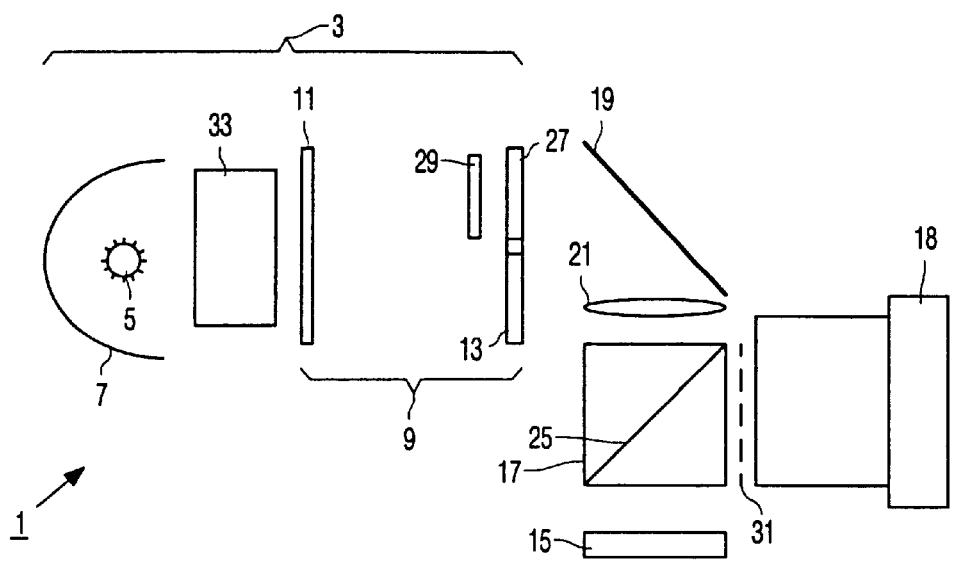
FIG. 1 shows a first embodiment of an image projection system according to the invention.

The image projection system 1 shown in FIG. 1 comprises an illumination system 3 for supplying an illumination beam. The illumination system 3 comprises a radiation source 5 and a reflector 7. The reflector 7 at least partly surrounds the radiation source 5 and ensures that the greater part of the light emitted by the radiation source in a direction away from the system as yet reaches the system.

The illumination beam generated by the illumination system 5 is incident on the display system, represented for the sake of simplicity by a single image display panel 15, and is modulated thereby in conformity with the image information to be displayed. A polarization-sensitive beam splitter 17 is arranged between the illumination system 5 and the display panel 15. The light modulated and reflected by the display panel is projected on a screen (not shown) by means of a projection lens system represented for the sake of simplicity by a single projection lens 18.

In FIG. 1, light coming from the illumination system 3 is sent to the polarization-sensitive beam splitter 17 via a folding mirror 19 and a lens 21.

Figure 3:
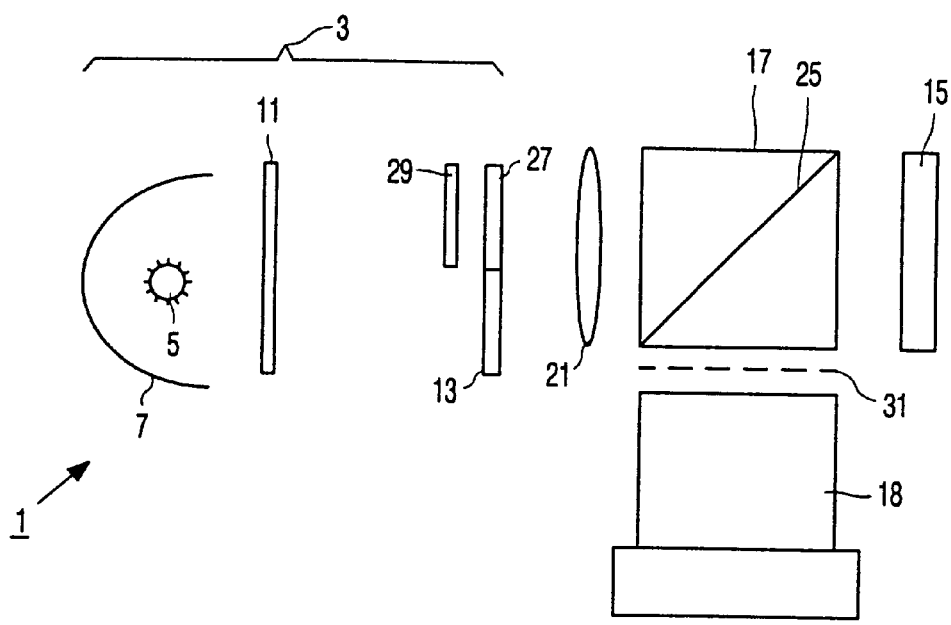
FIGS. 3 and 4 show a second and a third embodiment of an image projection system according to the invention.

FIG. 3 shows a second embodiment of an image projection system according to the invention, in which the folding mirror is omitted.

The display panel is, for example, a TN-LCD display panel in which a given voltage is present across the liquid crystalline layer for pixels in the bright state, whereas a different voltage is present across the liquid crystalline layer for pixels in the dark state. Consequently, the molecules of the liquid crystalline material will be oriented in a given direction for pixels in the bright state, and the direction of polarization of incident light will be, for example, modified. For pixels in the dark state, the liquid crystalline material will have a different orientation, such that the direction of polarization of incident light will not be modified. The light whose direction of polarization has been modified by the display panel will no longer be passed by the beam splitter but will be reflected towards the projection lens 18. The light coming from pixels of the display panel representing dark pixels in the image is passed by the polarization-sensitive beam splitter again and sent back, via or not via the folding mirror 19, towards the illumination system 3 because the direction of polarization of this light has remained unmodified.

Both in FIG. 1 and in FIG. 3, the interface 25 of the beam splitter 17 should be oriented in such a way that the part of the light coming from the light source and having the unwanted direction of polarization for the display panel is reflected from the light path, and that light coming from the display panel with a modified direction of polarization (in this embodiment, light representing bright pixels) is reflected towards the projection lens. The direction of polarization desired for the display panel and the direction of polarization of the light representing the dark pixels correspond to each other and are thus passed by the interface 25.

The present invention proposes to provide the illumination system with an extra optical system for at least partly re-illuminating the display panel with light reflected by the display panel, that is, light which is reflected by display elements representing dark pixels in the image. The extra optical system comprises means for redistributing light coming from such a display element across a plurality of display elements. In known systems, the light reflected by such display elements is reflected from the light path by the beam splitter and is thus lost. In the image projection system according to the invention, this light is recuperated and is given another opportunity of being incident on display elements giving rise to bright pixels in the image.

In the embodiments of the image projection system according to the invention, shown in FIGS. 1 and 3, the illumination system not only comprises a radiation source, a reflector and a condensor lens, but also an integrator system. The lens 21 behind the integrator system ensures that all re-images are superimposed in the plane of the display panel.

The integrator system 9 comprises a first lens plate 11 and a second lens plate 13 and ensures a homogeneous illumination of the display panel. For a detailed description of the principle of an integrator system with two lens plates, reference is made to U.S. Pat. No. 5,098,184.

Instead of two integrator plates, the integrator system may alternatively comprise a bar-shaped integrator. The illumination system is then made uniform by multiple total internal reflection on the side walls of the bar. The bar may be implemented, for example, as a quartz bar.

Figure 2A:
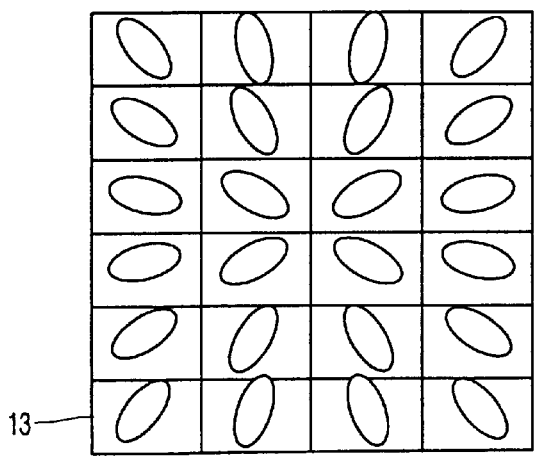
FIG. 2(a) shows diagrammatically the light distribution across the second integrator plate.
Figure 2B:
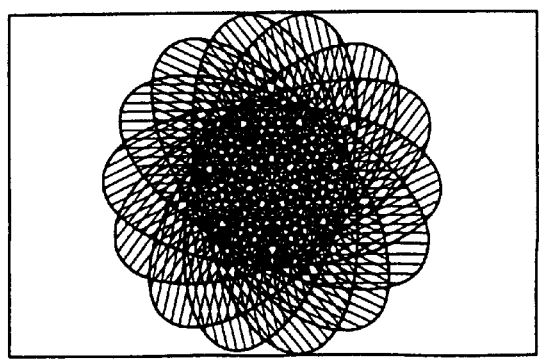
FIG. 2(b) shows the image of the light distribution in the second integrator plate via the third integrator plate on the display panel.

If the integrator system comprises two integrator plates, the extra optical system comprises a third integrator plate 27 and a reflecting element 29. The light reflected on the display panel and being sent towards the illumination system 3 via the beam splitter 17 reaches the plane of the second integrator plate 13. The alignment of the lens 21 allows optimization of the position where the reflected light arrives. Due to the presence of this lens 21, an image of the second integrator plate is formed in the plane of the second integrator plate. The third integrator plate 27 is situated at the position where this image is formed. An image of the light distribution across the first integrator plate 11 is formed in the focal plane of the third integrator plate 27. The reflecting element 29 is situated between the third integrator plate 27 and the position where the image of the light distribution across the first integrator plate 11 is realized. The light distribution across the first integrator plate is reflected to the third integrator plate 27 by the reflecting element 29 and serves as illumination for the third integrator plate 27. The complete display panel is re-illuminated via this integrator plate 27. The light distribution across the display panel of the illumination via the third integrator plate is a superposition of light spots in the first integrator plate. FIG. 2(b) diagrammatically shows an example. Since the light spots in the second integrator plate are more concentrated in the center of the individual lenses, the light serving to enhance the peak brightness will rather reach the center of the image. FIG. 2(a) shows diagrammatically the light distribution across the second integrator plate.

The redistribution of the light may be influenced by rendering the focal length of the individual lenses in the third integrator plate mutually different. Another way, with which the same object is achieved, is to vary the distance between the reflecting element and the third integrator plate.

The display panel is, for example, a display panel which is sequentially illuminated with a red, a green and a blue beam, while the display panel is simultaneously driven with the image having the color of the corresponding illumination.

Figure 4:
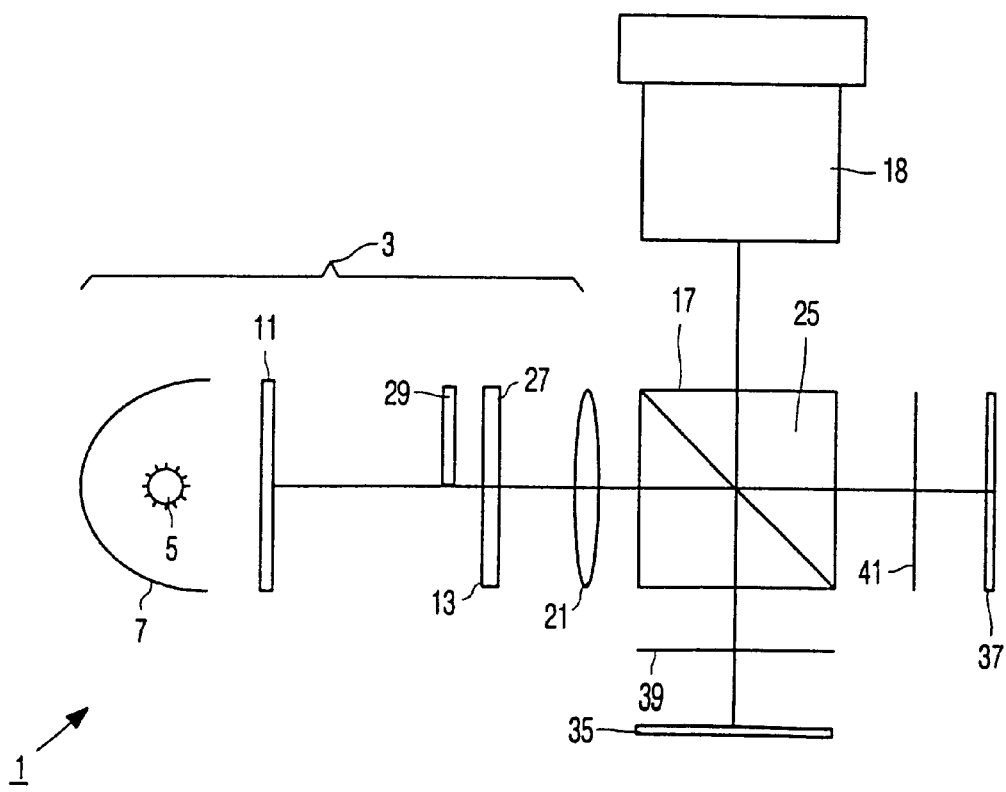

The image projection system may alternatively comprise two or three display panels. An embodiment using two display panels is shown in FIG. 4. The unpolarized light from the illumination system 3 is incident on a polarizing beam splitter 17 via the integrator system and the extra optical system. One direction of polarization is passed on the interface 25 in the beam splitter 17, whereas the other direction of polarization of the beam from the light source is deflected. The embodiment of FIG. 4 comprises two reflective display panels 35, 37. The display panel 35 is, for example, a display panel modulating red light only. To limit loss of light, a dichroic mirror 39 passing only red light and reflecting green and blue light is arranged in front of the display panel 35. Due to the modulation, the direction of polarization of the red light, yielding bright pixels, will change and, consequently, the light whose direction of polarization has changed will be deflected towards the projection lens 18. The display panel 37 is, for example, a display panel modulating both blue and green light. Now, a dichroic mirror 41 passing green and blue light and reflecting red light is arranged in front of the display panel 37. Due to the modulation, the direction of polarization of the light yielding bright pixels will also be modified in this case so that this light will be passed towards the projection lens 18 by the beam splitter 17. By providing the image projection system with an integrator system (11, 13) and an optical system (27, 29) as described above, the light coming from pixels representing dark pixels in the image will be recuperated, as described above with reference to a single display panel.

To optimize the contrast, an additional polarizer 31 may be arranged between the polarizing beam splitter 17 and the projection lens 18. This polarizer will optimize the blackening of the pixels in the dark state. Since this component is optional, it is denoted by way of a broken line.

The illumination system may be implemented in such a way that the supplied light is already polarized by providing the illumination system with, for example, a polarization conversion system 33. Such a system is known from, for example, the published international patent application WO 96/05534. In this case, the beam splitter only plays the role of analyzer and then has the function of sending the modulated light for the bright pixels to the projection lens and the modulated light for the dark pixels back to the illumination system. The polarization conversion system may be arranged, for example, between the light source and the integrator system. The illumination beam from the illumination system then has the direction of polarization which is desired for the display panel and will be passed substantially completely by the beam splitter towards the display panel.

What is claimed is:

1. An image projection system comprising, in this order, an illumination system with a radiation source and an image display system with at least one reflecting image display panel for modulating, with image information, an illumination beam to be supplied by the illumination system, and a projection lens system, a polarization-sensitive beam splitter being arranged between the illumination system and the display panel, characterized in that the illumination system comprises an extra optical system for at least partly re-illuminating the image display system with the light reflected by the image display system to the illumination system, the extra optical system comprising means for redistributing light coming from a pixel of the image display system across a plurality of pixels of the image display system.

2. An image projection system as claimed in claim 1, in which the illumination system comprises an integrator system, characterized in that the integrator system comprises a first and a second integrator plate, and in that the extra optical system comprises a third integrator plate, a lens system and a reflecting element, the third integrator plate being situated in the plane of the second integrator plate, in that the lens system is arranged between the integrator system and the image display panel for at least partly imaging an image of the second integrator plate reflected by the image display panel on the third integrator plate, and in that the reflecting element is arranged between the third integrator plate and its focal plane.

3. An image projection system as claimed in claim 1 wherein an additional polarizer is arranged between the polarization-sensitive beam splitter and the projection lens system.

4. An image projection system as claimed in claim 1, wherein the distance between the third integrator plate and the reflecting element is variable.

5. An image projection system as claimed in claim 1, wherein the individual lenses of the third integrator plate have mutually different focal lengths.

6. An image projection system as claimed in claim 1 wherein the illumination system comprises a polarization conversion system.

* * * * *